United States Patent
Kiss et al.

(10) Patent No.: US 6,484,155 B1
(45) Date of Patent: Nov. 19, 2002

(54) KNOWLEDGE MANAGEMENT SYSTEM FOR PERFORMING DYNAMIC DISTRIBUTED PROBLEM SOLVING

(75) Inventors: Peter A. Kiss, Huntsville, AL (US); Robert S. Daniel, III, Huntsville, AL (US); Jeffrey S. Yalowitz, Huntsville, AL (US)

(73) Assignee: Sentar, Inc., Huntsville, AL (US)

( * ) Notice: Subject to any disclaimer, the term of this patent is extended or adjusted under 35 U.S.C. 154(b) by 0 days.

(21) Appl. No.: 09/357,785

(22) Filed: Jul. 21, 1999

Related U.S. Application Data
(60) Provisional application No. 60/093,522, filed on Jul. 21, 1998.

(51) Int. Cl.[7] ............................ G06F 17/00; G06F 15/16
(52) U.S. Cl. ............................ 706/46; 706/45; 709/202
(58) Field of Search ..................... 706/45, 46; 709/202

(56) References Cited

U.S. PATENT DOCUMENTS

| | | | |
|---|---|---|---|
| 4,323,966 A | | 4/1982 | Whiteside et al. |
| 4,841,456 A | | 6/1989 | Hogan, Jr. et al. |
| 4,868,763 A | | 9/1989 | Masui et al. |
| 5,224,204 A | * | 6/1993 | Tsuruta et al. ................. 706/46 |
| 5,321,813 A | | 6/1994 | McMillen et al. |
| 5,349,654 A | | 9/1994 | Bond et al. |
| 5,448,724 A | | 9/1995 | Hayashi |
| 5,465,319 A | | 11/1995 | Ahamed |
| 5,537,653 A | | 7/1996 | Bianchini, Jr. |
| 5,539,877 A | | 7/1996 | Winokur et al. |
| 5,561,759 A | | 10/1996 | Chen |
| 5,581,689 A | | 12/1996 | Slominski et al. |
| 5,592,610 A | | 1/1997 | Chittor |
| 5,592,611 A | | 1/1997 | Midgely et al. |
| 5,628,011 A | | 5/1997 | Ahamed et al. |
| 5,655,081 A | | 8/1997 | Bonnell et al. |
| 5,675,723 A | | 10/1997 | Ekrot et al. |
| 5,675,724 A | | 10/1997 | Beal et al. |
| 5,778,150 A | * | 7/1998 | Chan et al. .................... 706/46 |
| 5,809,493 A | | 9/1998 | Ahamed et al. |
| 5,920,848 A | * | 7/1999 | Schutzer et al. ............... 705/42 |
| 5,937,397 A | * | 8/1999 | Callaghan ..................... 706/10 |
| 5,970,490 A | * | 10/1999 | Morgenstern ................. 707/10 |
| 5,983,200 A | * | 11/1999 | Slotznick ...................... 705/26 |
| 6,012,152 A | * | 1/2000 | Douik et al. .................. 714/26 |

(List continued on next page.)

OTHER PUBLICATIONS

Zhang et al.; "Intelligent Agents in Network and Service Management". 1996 Global communications conference, Nov. 1996, vol. 3, pp. 1855–1861.*

Nardi et al.; "Collaborative Programmable Intelligent Agents". Communications of the ACM, Mar. 1998, vol. 41, Iss. 3, pp. 96–104.*

*Primary Examiner*—Thomas Black
*Assistant Examiner*—Kelvin Booker
(74) *Attorney, Agent, or Firm*—John E. Whitaker; Merchant & Gould

(57) ABSTRACT

Disclosed is an invention that provides a knowledge management system that supports inquiries of distributed knowledge resources. Those inquiries may be in the form of questions or problem statements presented by a user. Interaction between a user and the knowledge resources is mediated by a collection of cooperative intelligent agents. The cooperative intelligent agents incorporate generalized automated negotiation and distributed inference (i.e., problem-solving) processes. Using those processes in a hierarchical architecture, the invention analyzes input problem statements and organizes the problem statements as sets of tasks. In pursuit of each task, the invention solicits accessible knowledge repositories, represented by knowledge agents, for relevant knowledge, and then analyzes and integrates responses from those knowledge repositories. The invention may then provide the responses to a human user or a using process.

33 Claims, 13 Drawing Sheets

U.S. PATENT DOCUMENTS

| | | | | |
|---|---|---|---|---|
| 6,049,819 A | * | 4/2000 | Buckle et al. | 709/202 |
| 6,065,039 A | * | 5/2000 | Paciorek | 709/202 |
| 6,144,989 A | * | 11/2000 | Hodjat et al. | 709/202 |
| 6,182,068 B1 | * | 1/2001 | Culliss | 707/5 |
| 6,226,666 B1 | * | 5/2001 | Chang et al. | 709/202 |
| 6,243,396 B1 | * | 6/2001 | Somers | 370/469 |
| 6,255,943 B1 | * | 7/2001 | Lewis et al. | 340/506 |
| 6,263,358 B1 | * | 7/2001 | Lee et al. | 709/100 |
| 6,266,805 B1 | * | 7/2001 | Nwana et al. | 717/104 |
| 6,314,555 B1 | * | 11/2001 | Ndumu et al. | 706/49 |
| 6,338,081 B1 | * | 1/2002 | Furusawa et al. | 709/202 |

* cited by examiner

In a corporate setting user interacts with KnoWeb™ for "what ifs"

KNOWLEDGE MANAGEMENT SYSTEM FOR PERFORMING DYNAMIC DISTRIBUTED PROBLEM SOLVING

RELATED APPLICATIONS

This application claims priority from co-pending U.S. Provisional Patent Application Serial No. 60/093,522 filed on Jul. 21, 1998 and entitled Knowledge Web for Large-Scale Evolving, Distributed Knowledge Resources.

GOVERNMENT CONTACTS

The development of this invention was funded at least in part under U.S. Government Contract No. DASG6O-98-C-0104.

FIELD OF THE INVENTION

The present invention relates to knowledge computing systems, and more particularly relates to large-scale distributed knowledge systems.

BACKGROUND OF THE INVENTION

Organizations managing complex operations such as military command and control, medical diagnosis and treatment, and enterprise management have turned to large-scale knowledge systems as a means to effectively capture and maintain their knowledge assets. Those assets are being deployed across distributed computing resources including intranets and the Internet.

The technology supporting such systems has progressed to the point of being able to capture and use knowledge on the order of thousands of knowledge units (algorithms/rules/frames/axioms) to support human-like problem solving. However, until now there has not existed a knowledge management system able to support dynamic distributed problem solving over multiple large-scale and distributed knowledge systems. Such a system must be capable of manipulating and coordinating hundreds of thousands to millions of knowledge units.

One reason for that shortcoming is that typical systems, such as knowledge-based systems, employ inference engines that operate only on knowledge resident in specific knowledge bases that they control directly. For example, database search engines have the capability to manage information finding and retrieval, but they are not capable of retrieving knowledge in general form or combining knowledge retrieved from multiple sources into integrated inference patterns. In contrast, humans perform inference processes that involve widely distributed knowledge of more than one representation type or domain.

In addition, existing systems for performing distributed problem-solving functions typically require human reasoning intervention to bridge gaps in inference sequences, particularly between domain-specific and type-specific automated knowledge processing subsequences. In cases where the human intervention occurs, it usually takes the form of case-specific procedures implemented in software or hardware interfaces.

One example of an existing knowledge processing system is described in U.S. Pat. No. 5,465,319 issued to Ahamed, assigned to AT&T Corp., and entitled "Architecture for a Computer System Used for Processing Knowledge." Ahamed describes a knowledge machine for processing information and evolving knowledge. However, that system is limited because the knowledge stored must be organized in fixed links and in predetermined hierarchies, prior to any query of the knowledge. Moreover, the system described by Ahamed does not incorporate distributed inferencing that combines results of multiples of distinct, as well as overlapping and conflicting knowledge modules. In addition, the system of Ahamed requires centralized control of the allocation of knowledge processing hardware resources and of the execution of the knowledge representation of those hardware resources.

Another example of an existing knowledge processing system is described in U.S. Pat. No. 5,628,011 issued to Ahamed et al., assigned to AT&T Corp., and entitled "Network-Based Intelligent Information-Sourcing Arrangement." Ahamed et al. describe a system in which knowledge bases are arranged hierarchically in a "knowledge ring." Queries are collected and passed to the knowledge ring. The system restates the question in a way that the knowledge base is integrated, and, upon confirmation, responds to the query. However, that system is limited to the use of static knowledge trees. Any query must match an existing entry in the knowledge dictionary. The system of Ahamed et al. basically locates and retrieves pre-existing data by a search of the static knowledge tree, which is essentially a taxonomy of hierarchically-related subject names.

Yet another example of an existing knowledge processing system is described in U.S. Pat. No. 5,809,493 issued to Ahamed et al., assigned to Lucent Technologies, Inc. entitled "Knowledge Processing System Employing Confidence Levels." Ahamed et al. describe a knowledge processing system which processes knowledge in the knowledge domain to generate incremental and integrated conclusions, and in the numerical domain to generate confidence levels. The knowledge processing system iteratively revises solutions to generate an optimal solution based on the confidence levels. However, that system fails to describe dynamic problem solving, but rather builds confidence in pre-existing problem solutions by building databases of previous attempts to solve the same problem. The described system uses pre-determined (non-dynamic) knowledge operations mappings.

Accordingly, a need exists for a knowledge management system for dynamic, distributed problem-solving systems.

SUMMARY OF THE INVENTION

The present invention overcomes the problems identified above by providing a knowledge management system that supports inquiries of distributed knowledge resources. Those inquiries may be in the form of questions or problem statements presented by a user. Interaction between a user and the knowledge resources is mediated by a collection of cooperative intelligent agents.

The cooperative intelligent agents incorporate generalized automated negotiation and distributed inference (i.e., problem-solving) processes. Using those processes in a hierarchical architecture, the invention analyzes input problem statements and organizes the problem statements as sets of tasks. In pursuit of each task, the invention solicits accessible knowledge repositories, represented by knowledge agents, for relevant knowledge, and then analyzes and integrates responses from those knowledge repositories. The invention may then provide the responses to a human user or a using process.

The invention adaptively and dynamically synthesizes problem-specific knowledge interfaces and reasoning procedures as the problem-solving process moves forward. The invention extends automated inference capability to make use of a large number of knowledge sources of different types, in different locations, and covering different domains of expertise.

In one aspect, the invention integrates established knowledge-based environments or other software-based knowledge by breaking them down into well-defined, independent "knowledge modules." The knowledge modules contain knowledge and knowledge processing capabilities (e.g., inferencing, database management, algorithms, etc.) for a domain of knowledge. Knowledge modules are independent and may contain overlapping or exclusive knowledge. Each knowledge module is combined with a cooperative intelligent agent to form a unit that facilitates integration with other units. The units allow the system to support cooperative reasoning through distributed inference (and problem-solving) processing. The encapsulation of restricted knowledge content within the units and their well-defined interfaces aids verification. The resulting architecture supports the development of a continuously evolving, distributed knowledge system.

More specifically, the present invention provides a hierarchical knowledge management system having three general layers: a user interface layer, a meta agent layer, and a knowledge agent layer. Each layer in the system includes one or more intelligent agents responsible for one portion of the distributed problem-solving inferencing process. The user interface layer mediates the direct interactions with the user, which affords control of and a window into the system's activities. The meta agent layer analyzes user queries or problem formulations from the user interface layer, allocates tasks to the knowledge agent layer, resolves conflicts arising from the knowledge agent layer, and consolidates (including fusing and deconflicting) results provided by the knowledge agent layer. The knowledge agent layer provides an interaction mechanism for knowledge modules having associated knowledge agents within the knowledge agent layer. Each agent in the system includes inter-agent abstract communications facilities with the capability to negotiate with each other, conduct joint planning, and to collaborate in the execution of planned tasks.

In addition to the three layers just mentioned, an agent service layer provides services for maintaining a registry of agents in the system, as well as supporting the distributed problem solving. The registry identifies each agent's capabilities and interests, and contains knowledge about the relationships between them. The meta agent layer and the knowledge agent layer may confer with the agent service layer to identify those other resources capable of furthering the problem-solving process. A matchmaking facility is provided for notifying agents interested in a capability of other agents that provide the capability.

One advantage of the present invention over existing technologies is that inferencing is distributed and cooperative over a distributed environment. In other words, the problem-solving process has been removed from a centrally-located reasoning mechanism and made granular. Rather than relying on a single knowledge-based system to formulate and execute a problem-solving process, inferencing mechanisms are distributed to many, smaller knowledge systems with each having a more clearly defined set of interests and products. Each smaller knowledge system is provided with knowledge processing capabilities for its domain of knowledge. A meta agent is responsible for decomposing a general inquiry into a series of constituent tasks. Each task is formulated based on knowledge of the capabilities of the underlying knowledge systems. By cooperating with each other, the meta agent and knowledge agents at each knowledge system accomplish each task toward solving the global problem.

Another advantage is that a knowledge management system in accordance with the present invention is scalable and modular so it can evolve continuously without a negative impact on previously existing components. Once established knowledge systems are broken down into smaller units with distributed inferencing capability, each of those smaller units may be modified, added, deleted, replaced, or supplemented with additional units having greater processing, knowledge, or inferencing capabilities. This advantage allows the system to evolve as technology develops and knowledge systems become more and more complex.

Yet another advantage is that a knowledge management system in accordance with the present invention is non-monolithic. The distributed nature of the disclosed knowledge management system prevents a single inference engine from dominating the system. Problem-solving processes are conducted in a cooperative manner among many intelligent agents, each having its own realm of expertise.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The present invention may be embodied in a knowledge management system for interacting with distributed knowledge systems. Briefly described, agents in the knowledge management system collaborate with each other and with knowledge modules to perform dynamic distributed-inferencing and problem-solving tasks associated with finding solutions to problems that users input. Problem-solving knowledge is organized in the knowledge management system to match the agent roles. One example of such a system is the KnoWeb knowledge management system owned and licensed by Sentar, Inc. of Huntsville, Ala.

Figure 1:
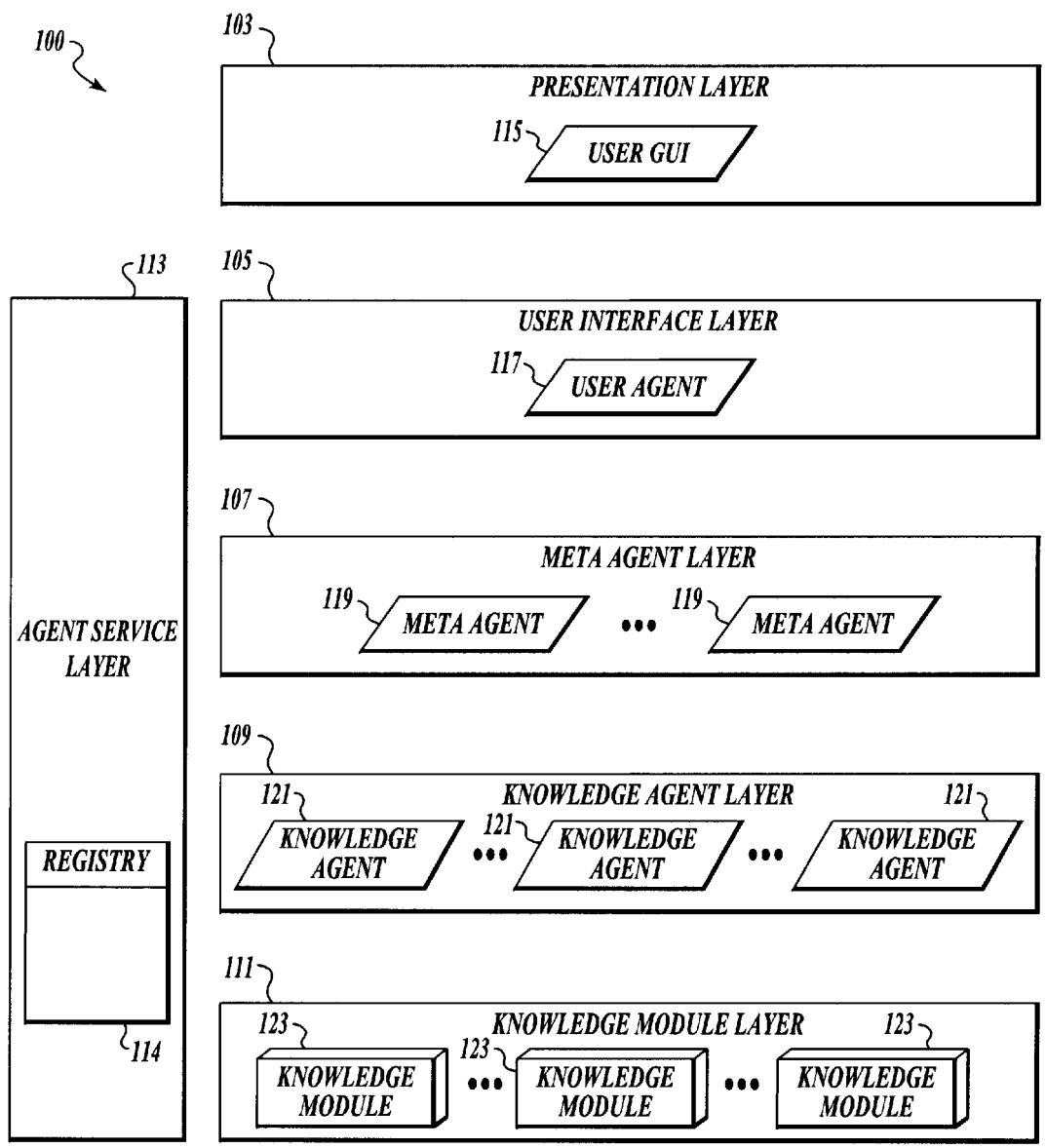
FIG. 1 is a conceptual overview of one embodiment of a knowledge management system constructed in accordance with the present invention.

FIG. 1 is a conceptual overview of one embodiment of a knowledge management system constructed in accordance with the present invention. Illustrated is a layered knowledge management system 100 including a presentation layer 103, a user interface layer 105, a meta agent layer 107, a knowledge agent layer 109, a knowledge module layer 111, and an agent service layer 113. Each of these components is described here, and the operation of the knowledge management system 100 is described later.

The presentation layer 103 provides the user with a graphical user interface 115 to interface with the system. The graphical user interface 115 accepts user inputs and displays system output to the user.

The user interface layer 105 includes a user agent 117. The user agent 117 is endowed with knowledge of display metaphors, user I/O formats, and problem domains. The user agent 117 mediates the direct interactions between a user and the knowledge management system 100, affording control of and a window into the environment's activities.

The meta agent layer 107 includes one or more meta agents 119. Briefly described, each meta agent 119 analyzes queries or problem formulations provided by the user interface layer 105 and constructs a plan for finding a solution to the problem. The meta agent 119 contains knowledge of problem solving methodologies and distributed inferencing procedures. The meta agent 119 contains knowledge of how to dynamically bring available knowledge resources together as and when needed to provide a response to the inquiry. The meta agent 119 may, but need not maintain the domain-specific knowledge necessary to answer the inquiry directly.

The meta agent 119 is responsible for formulating a dynamic "solution plan" for the distributed inferencing to be performed by the system 100, and allocates tasks to the knowledge agent layer 109 in furtherance of the solution plan. The planning capability of the meta agent 119 includes the ability to formulate parallel sub-plans and perform iterative and recursive procedures. The meta agent 119 is configured to begin executing the solution plan even before the plan is complete, with further plan development dependent on the dynamics of intermediate results obtained during the plan execution. The meta agent 119 is capable of backtracking or replanning to permit escape during plan execution from dead-end or otherwise unproductive search paths.

The meta agent 119 executes the solution plan by maintaining an agenda, commitment table, task queue, knowledge manager, or equivalent dynamic control service. The dynamic control service is used to monitor pending tasks and tasks in progress. Tasks may be added, deleted, or modified in response to intermediate results returned during execution of the solution plan. The meta agent 119 is configured to evaluate the state of each step in the solution plan during execution to determine when the goals embodied in the solution plan have been achieved. The meta agent 119 maintains the state of solution-plan execution for reporting to the user agent 117. Meta agents 119 need not be persistent. They can be incarnated to handle individual inquiries. The meta agent layer 107 is also responsible for consolidating the results provided by the knowledge agent layer 109. Consolidation of results in the meta agent 119 includes deconfliction and fusion of results from multiple instances of similar knowledge modules.

In addition to solution planning and execution, the meta agent 119 is capable of resolving conflicts arising from inconsistent responses from the knowledge agent layer 109. For instance, the meta agent 119 is capable of performing a test to analyze responses from the knowledge agents 121, discussed below, to determine any ontological and semantic similarities between the responses. Such testing may include determining if the responses describe identical ontological, syntactic, and semantic entities and if the responses differ only in value, determining if the responses describe identical ontological and semantic entities, but exhibit syntactic differences, and determining if the responses describe entities for which the ontological, syntactic, and semantic similarity does not meet a specified threshold.

If the results of such a test indicate that the responses describe identical ontological, syntactic, and semantic entities and differ only in value, the meta agent 119 may consolidate the responses using a consolidation technique, such as statistical analysis, Bayesian analysis, boolean logic, voting, or algorithmic convolution. However, if the similarity test determines that syntactic differences exist, the responses are analyzed to determine if a common intermediate form exhibiting identical ontological, syntactic, and semantic properties exists into which all responses can be converted. If so, then the consolidation technique is applied. In all other cases, the responses are submitted to the user for assessment and user selection of the response to be accepted. If this selected response represents an intermediate response (solution to a sub-problem), the user's selection is submitted back to the system and used to support subsequent processing of the user's query.

The knowledge agent layer 109 provides the direct interface and interaction mechanism for the knowledge modules 123 within the knowledge module layer 111. Within the knowledge agent layer 109 are multiple knowledge agents 121. Each knowledge agent 121 may be associated with one or more knowledge modules 123 in the knowledge module layer 111. The knowledge agent 121 is configured to accept from a meta agent 119 a problem statement and convert that problem statement into a format appropriate for the knowledge module 123 associated with the knowledge agent 121.

In the preferred embodiment, the knowledge agents 121 are coupled in a one-to-one relationship with the knowledge modules 123. However, a many-to-one relationship between a set of knowledge agents 121 and a knowledge module 123 is possible, given that each associated knowledge agent 121 presents a different aspect of the knowledge maintained by the knowledge module 123.

Knowledge agents 121 maintain summaries of the knowledge domain features and methods of the knowledge modules with which they are associated. Each knowledge agent 121 publishes to the agent service layer 113 the capabilities, interests, and attributes of the knowledge agent's associated knowledge module 123. In addition, a knowledge agent 121 may enhance the capabilities of its associated knowledge module 123 based on the published capabilities of other knowledge agents 121 and their associated knowledge modules 123. Each knowledge module 123 is a domain knowledge source, and may be a conventional knowledge base, a data base, a simulation, a software routine, a world wide web site, a real-time data stream (e.g., a sensor), a computational resource (e.g., algorithms, software processing routines, software libraries, or distributed software objects), a device, or the like. The knowledge agents 121 provide the domain specific knowledge required by the meta agent 119. A knowledge agent 121 may be persistent, so long as its associated knowledge module 123 is included in the knowledge management system 100.

The agent service layer 113 maintains a registry 114 of the capabilities, interests, and attributes for the knowledge modules 123 as registered by the knowledge agent 121 associated with each knowledge module 123. The agent service layer 113 makes that information available to the meta agent layer 107 to assist with the formulation of the solution plan. The agent service layer 113 contains semantics for knowledge agents 121 to register for contributions in general as they relate to specific inference modes, described below. The agent service layer 113 may also provide mappings for each knowledge module 123 relating the capabilities to interests. This mapping may be used by the meta agent 119 to optimize problem solutions. The agent service layer 113 also provides a set of agent services that are used to facilitate agent-to-agent interactions. In addition, the agent service layer 113 provides a matchmaking facility that notifies agents of other agents which provide capabilities in which they have stated an interest. The matchmaking facility allows agents to dynamically respond to changes in the environment. Each agent in the knowledge management system 100 may be connected to the agent service layer 113.

Distributed Inferencing Methods

The preferred embodiment of the present invention makes use of one of two distributed inferencing schemes, both based on the use of first-order logic. The first scheme assembles a problem-specific rule network as a distributed object under control by a meta agent, such as meta agent 119. The distributed rule network can be subjected to repeated use in execution of inferencing procedures by a production or theorem-proving inference engine.

The other available distributed inferencing scheme is a planner-based dynamic inferencing approach. In this scheme, inferencing proceeds within an agent until an intermediate goal is achieved, such as the generation of a query with instance data for broadcast to knowledge agents or response to a specific query for transmittal by a knowledge agent 121 to a meta agent 119. The action designated by achievement of the goal is then taken, starting the next step of the inferencing process. The meta agent 119 manages the dynamic distributed inferencing scheme, using an agenda mechanism or commitment table to assign and schedule portions of the inferencing procedures to the participating agents during execution.

In addition to the above identified distributed inferencing schemes, the present invention may operate in several distributed inferencing modes. Examples of the operation of the system in each of several distributed inferencing modes follows:

Linear: Meta agent should determine initial query to a particular knowledge agent. This is useful when (1) the query is straightforward, (2) limited number of knowledge agents are registered for domain or problem, and (3) problem domain history highly suggests that the goal can be reached with few queries.

Partitioned: The user query or problem domain is easily divided into distinct subfields, phases or sub-problems that share limited initial data. The meta agent should have available subfield and query division possibilities. The set of responses would be expected to contain limited redundancies and inconsistencies.

Replicated: User query and domain is highly ambiguous. Many knowledge agents have registered for the same domain, problem, or query type. Data is highly shared. Division of data and domain is difficult for the meta agent to perform. Assimilation of redundant and inconsistent data is highly possible.

Real time: User may express time quantity for the query, e.g. "I am willing to wait ten minutes for a response." The meta agent may deactivate the knowledge agent whose responses do not meet time delay and gather partial information from the incomplete knowledge agent. The meta agent chooses knowledge agents that have a history of rapid response or that can tailor their problem solving to real time.

Preemptive: The meta agent performs incremental processing of problem solving responses may preempt a knowledge agent that is still processing in order to divert or focus its attention in another direction of problem solving. This may be needed if the responses from other knowledge agents suggest inconsistencies or ambiguities that a currently processing knowledge agent can handle to more directly achieve a solution.

Qualitative: User may dictate the type of response needed. The meta agent dictates the type of response as part of its problem formulation. Possibly, it may replicate queries and information across knowledge agents and compare those responses (e.g., all "firsts") to determine the best solution.

The distributed inference mode or type may be selectable by the meta agent 119 or the user from the available set to best address the problem being solved.

Discussion of Operation

The starting point for problem solving is the submittal of a query to the presentation layer 103, via the user GUI 115, in the form of a description of information to be obtained by the knowledge management system 100. The query may be in any of several formats, including interrogative or imperative. For example, the query may request either a solution to a problem, such as predicting the outcome of a course of treatment, or the retrieval of information, such as the side effects of a medication. The user agent 117 parses the user inquiry and directs the parsed inquiry to a meta agent 119 for action.

The meta agent 119 formulates a goal statement for the problem-solving phase of the process, then formulates a solution plan for the problem. The meta agent solution plan attempts to employ all elements of information contained in the parsed inquiry in the development of search-space constraints. The meta agent 119 dynamically assesses the problem and its solution states (between users and the knowledge agents 121), divides the problem, and assigns the appropriate knowledge agents 121 to work on the solution. The meta agent 119 may access the agent service layer 113 to identify any knowledge agents 121 that have registered a capability that is relevant to the solution states of the problem. For example, if the problem involves a query about the effect on revenue of a particular increase in sales, the meta agent 119 may query the agent service layer 113 to identify one or more knowledge agents 121 that have registered a capability to provide sales-related knowledge.

To avoid ill-defined forms and to facilitate the search operations, preprocessing features that standardize the input and problem formats are incorporated in the meta agent 119. These may include formats related to factual answers, decisions, recommendations, predictions, diagnosis, optimizations, computations, process specifications, etc. Templates incorporate the standard methods to perform commonly used segments of problem-solving actions, such as look-ahead planning of follow-ups to meta agent queries.

After the solution plan is formulated, the meta agent 119 implements a distributed inference process to perform the search and execution phases of solving the problem, while maintaining control of the process. The meta agent 119 provides for the generation of subsidiary problem-solving requirements as a result of in-process operations and for acceptance of problem inputs from other meta agents 119 and knowledge agents 121.

The inference process may begin with accessing the agent service layer 113, or the broadcast of a query from a meta agent 119 to all the knowledge agents 121 in the knowledge management system 100. The query content is generated from the solution plan developed by the meta agent 119. Knowledge agents 121 that have relevant knowledge respond to the meta agent 119. If the distributed object rule network scheme is used, the knowledge agents that respond furnish links to the rule-network entry points they will use in execution and the result forms they will return. The meta agent 119 stores that information for use at appropriate points during inference execution. If the dynamic scheme is used, the query occurs during inference execution and contains instance values. The knowledge agents 121 that respond immediately execute the procedures they believe to be applicable and then send results to the meta agent 119.

The meta agent 119 receives all responses and stores them (possibly with filtering). It then deconflicts the received responses. The deconfliction may include the selection of one of the responses (on some ranking basis, if available), the inclusion of some or all of the responses in a disjunction, the rejection of all the responses, or the application of fusion mechanisms, such as a probabilistic selection criterion if probability data is included in the responses or the knowledge of the meta agent 119. The meta agent 119 assimilates the selected responses into its knowledge base for the problem being addressed, then performs internal inference, planning, or retrieval of the next steps in an ongoing plan.

As the session progresses, the meta agent 119 arbitrates conflicts that cannot be resolved at the knowledge agent layer 109 and formulates solution states to present to the user. Formulation of results includes the compilation of inferencing products, deconfliction and fusion when necessary, and the expression of the results in forms suitable for presentation to the user. Optionally, the results may be tested for consistency with known constraints or empirical data. To perform deconfliction and fusion, the meta agent has access to conventional multiple-source decision or estimation algorithms, as well as rule networks.

Figure 2:
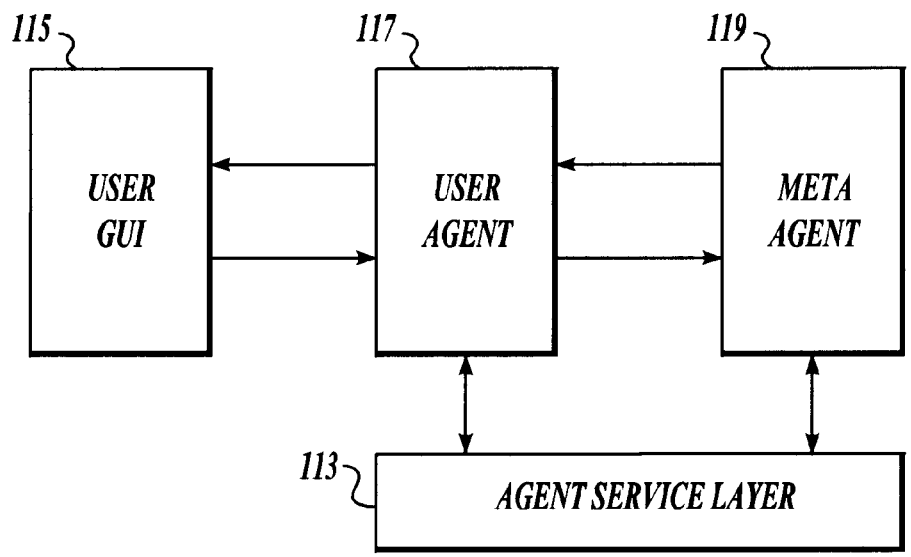
FIG. 2 is a functional block diagram illustrating exemplary communications among a user interface, a user agent, a Meta-Agent, and an agent service layer all constructed in accordance with the present invention.

FIG. 2 is a functional block diagram illustrating the flow of information between the user agent 117 and the other agents with which it interfaces. The user agent 117 determines the method for interacting with the user, and directs queries and problem formation from the user GUI 115 to the meta agent 119. For example, in response to a request from the meta agent 119 for user input, the user agent 117 issues to the user GUI 115 a user information request, and receives from the user GUI 115 the user information. The user agent 117 then forwards the user information to the meta agent 119. The user agent 117 may also receive from the user GUI 115 unsolicited user queries. The user agent 117 may issue to the user GUI 115 a restated query to confirm the accuracy of the query, and receive from the user GUI 115 a query confirmation verifying the accuracy of the restated query. The user agent 117 may interface with the agent service layer 113 to parse the user input into a standard query or problem formulation before passing the query to the meta agent 119 as a formulated question.

The user agent 117 may receive from the user GUI 115 a request for help or explanation. The user agent 117 interprets the request, formats an explanation, and returns that explanation to the user GUI 115. If the request for help or explanation requires more knowledge than that available at the user agent 117, a help request may be issued to the meta agent 119. An explanation from the meta agent 119 is then received from the meta agent 119 and passed to the user GUI 115. The user agent 117 may also be configured to pass status information received from the meta agent 119 to the user GUI 115. The meta agent 119 may also generate and issue to the user agent 117 any errors that occur during processing. The user agent 117 may then forward those errors to the user GUI 115.

Finally, when the meta agent 119 has arrived at the answer to the formulated question, the user agent 117 receives from the meta agent 119 that answer and provides it to the user GUI 115. It should be noted that the user agent 117 and the meta agent 119 are constantly interfacing with the agent service layer 113 throughout the exercise.

Figure 3:
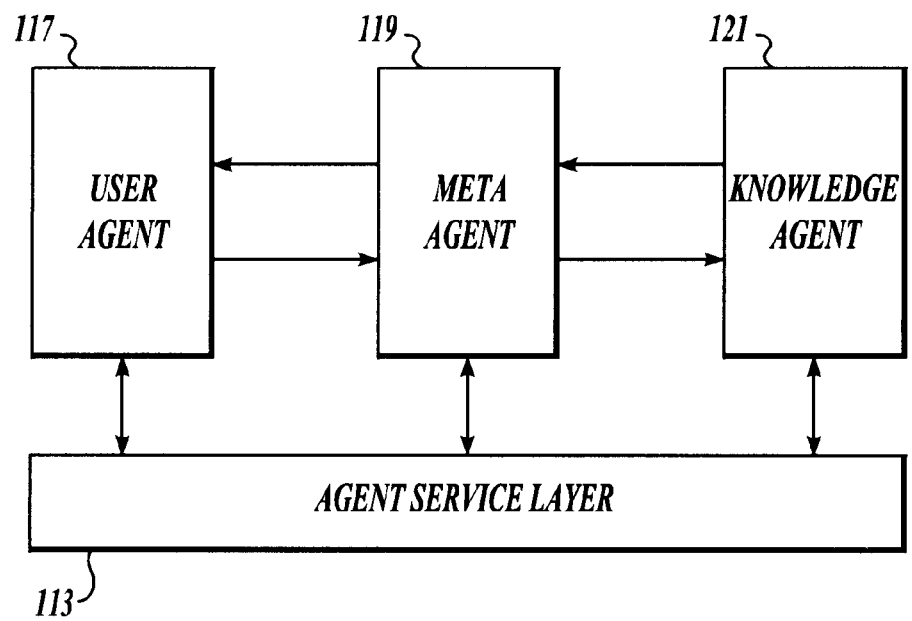
FIG. 3 is a functional block diagram illustrating exemplary communications among a user agent, a Meta-Agent, an agent service layer, and a knowledge agent all constructed in accordance with the present invention.

FIG. 3 is a functional block diagram illustrating the flow of information between the meta agent 119 and the other agents with which it interfaces. The meta agent 119 receives from the user agent 117 the formulated question. The meta agent 119 analyzes the formulated question to formulate a solution plan. By interacting with the agent service layer 113, the meta agent 119 allocates and assigns tasks to knowledge agents 121 based on the interests and capabilities of those knowledge agents 121.

As processing continues, the meta agent 119 may issue to the user agent 117 a request for user information. The meta agent 119 then receives from the user agent 117 the user information and stores that information for later reference. The meta agent 119 may receive from the user agent 117 a user's request for help or an explanation. The meta agent may formulate a response to the user's request, and return that response to the user agent 117.

As processing proceeds, the knowledge agent 121 may request additional information needed to complete its task. The meta agent 119 receives the information request from the knowledge agent 121, and identifies an appropriate source for that information by interacting with the agent service layer 113. Each knowledge agent 121 in the system registers with the agent service layer 113 its interests and capabilities. The meta agent 119 then provides a response to the knowledge agent 121. Providing the response may involve formulating an additional task to be performed by another knowledge agent (not shown) to provide the needed information.

The knowledge agent 121 may issue status reports to the meta agent 119. The meta agent 119 then reports the status to the user agent 117. Likewise, the meta agent 119 may receive notification of errors that occur during processing by the knowledge agent 121, and the meta agent 119 may report those errors to the user agent 117 along with any errors that may occur at the meta agent 119.

The meta agent 119 receives from the knowledge agent 121 the results of the knowledge agent's task. The meta agent 119 may consolidate the results from several knowledge agents 121 if more than one are employed to solve the problem. If more than one knowledge agent 121 is employed, the meta agent 119 resolves any conflicts between the results received from each of the knowledge agents 119. After deconfliction, the meta agent 119 provides the final answer to the user agent 117.

Figure 4:
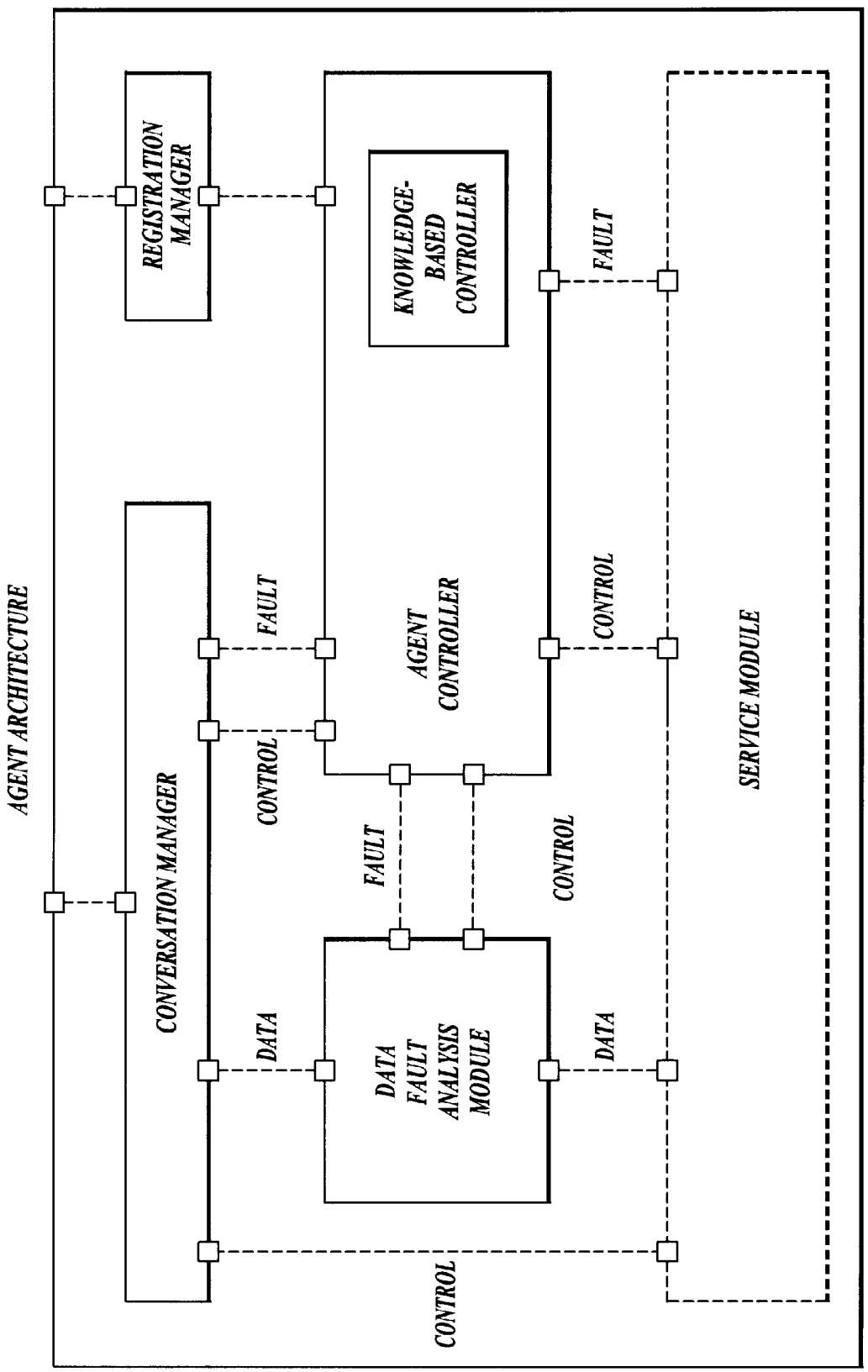
FIG. 4 is a functional block diagram of an intelligent agent that may be employed in an embodiment of the present invention.

FIG. 4 is a functional block diagram of an exemplary agent 501 constructed in accordance with the present invention. The disclosed agent is described briefly here, but described in detail in co-pending U.S. patent application Ser. No. 90/001,119 filed on Dec. 30, 1997, and entitled "System and Method for Providing Highly-Reliable Coordination of Intelligent Agents in a Distributed Computing System", which is assigned to the same assignee as the instant application.

The agent architecture incorporates five major components used in all meta agents 119 and knowledge agents 121: a conversation manager, a registration manager, an agent controller, a data fault analysis module, and a service module. The first four of these components form a generalized framework for the agent and are reused across the agent subclasses. The service module contains software specific to the role of the agent in which it resides. Service modules are designed as "plug-ins," which require no changes to the framework for installation. The agent controller has at its core a knowledge manager that generates the plans which guide an agent's activities based on the knowledge associated with the particular agent.

Figure 5:
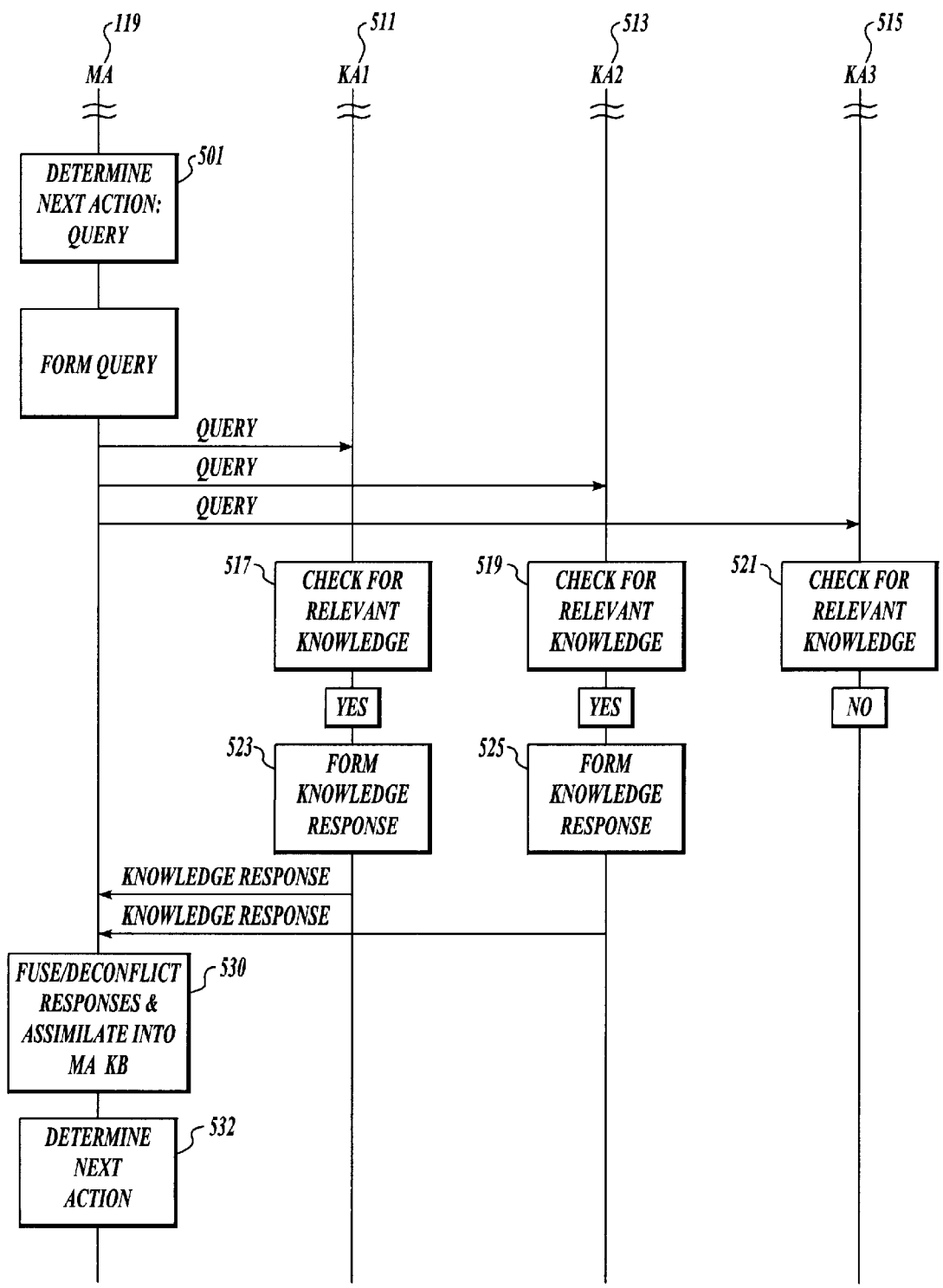
FIG. 5 is an event trace illustrating an inference procedure employed by one embodiment of the present invention.

FIG. 5 is an event trace illustrating a typical distributed inference process employed by the disclosed embodiments of the present invention during a problem-solving exercise. The inference process begins, at block 501, when the meta agent 119 determines that the next action on an agenda is a query. At block 503, the meta agent 119 responds by formulating a sub-problem query to be broadcast to each of multiple knowledge agents, such as KA1 511, KA2 513, and KA3 515.

Upon receiving the sub-problem query, each knowledge agent (KA1, KA2, KA3) performs a check for knowledge related to the sub-problem query. See blocks 517, 519, 521. In this example, KA3 515 determines that it has no knowledge relevant to the sub-problem query, but KA1 511 and KA2 513 both determine that they have relevant knowledge. At block 523 and block 525, KA1 and KA2, respectively, each formulate a knowledge response to the sub-problem query based on their own domains of knowledge. Each knowledge agent returns to the meta agent 119 their respective knowledge response.

At block 530, the meta agent 119 receives the knowledge responses from KA1 511 and KA2 513. The meta agent 119 may then, if necessary, resolve any ambiguities between the two knowledge responses through fusion or deconfliction operations. After any ambiguities or conflicts are resolved, the two knowledge responses are assimilated into the knowledge base of the meta agent 119. At block 532, the meta agent 119 determines the next action.

Figure 9:
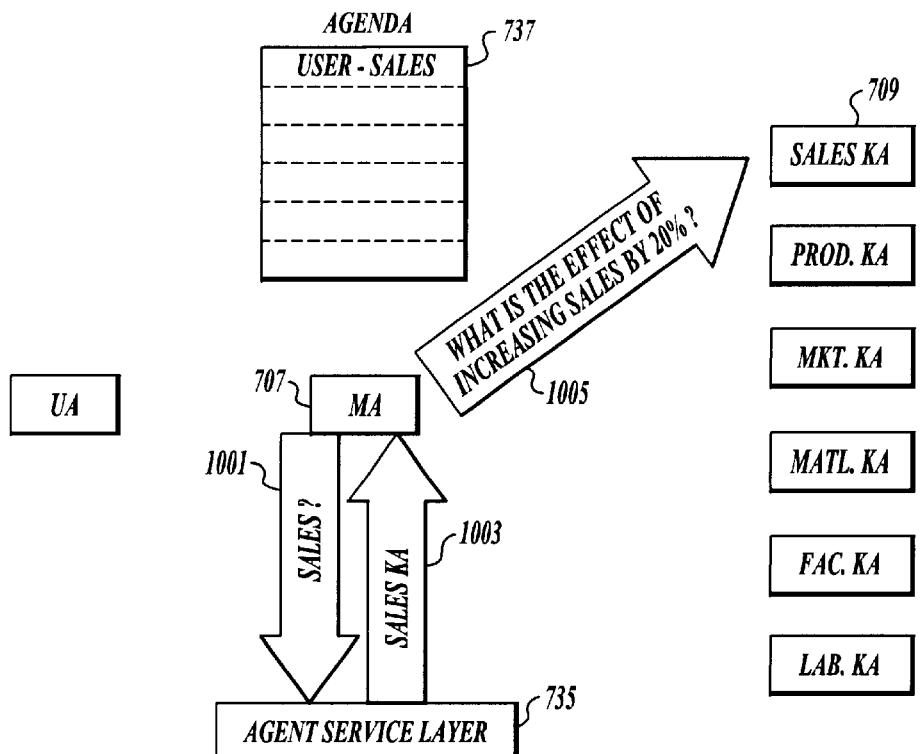
Figure 10:
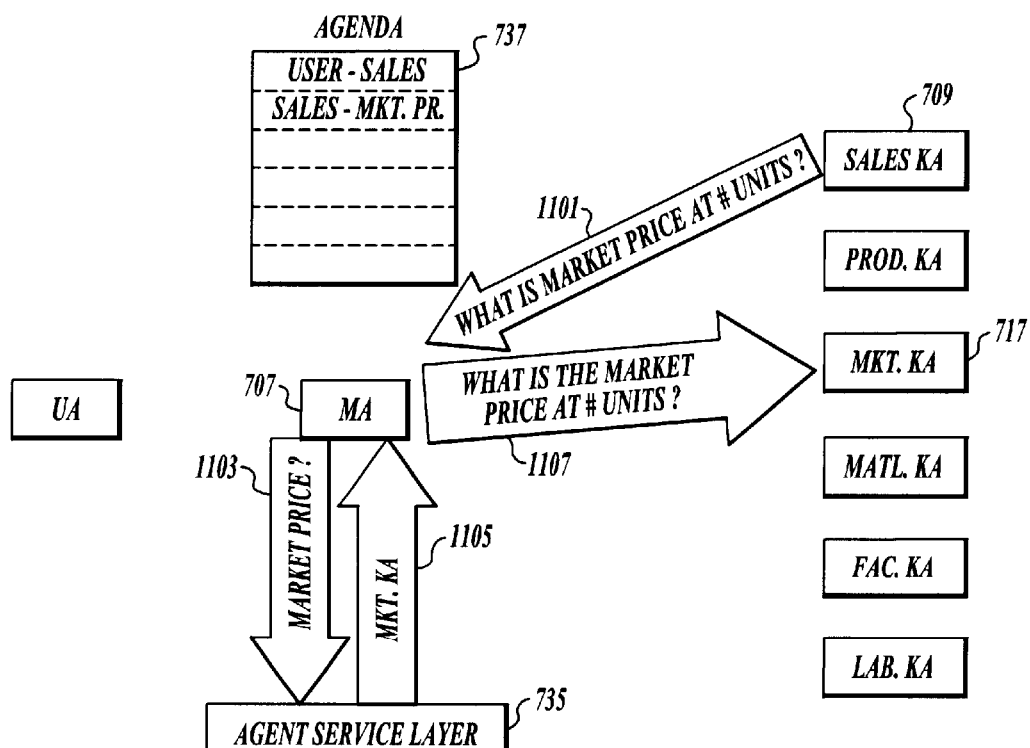

FIGS. 6–20 are a conceptual illustration of an exemplary knowledge management system 700 constructed in accordance with the present invention and deployed in a business management and planning environment. The system 700 provides a user with solutions to "what-if" scenarios in the business planning environment. In this example, the graphical user interface ("GUI") 703 of the disclosed system 700 includes a web browser to provide the user with access to the system 700 via the Internet or other wide area network. The user interacts with the GUI 703 to formulate a what-if scenario related to the business environment. The GUI 703 may present to the user an input screen, as illustrated in FIG. 9, through which the user can input variables of interest to the scenario.

Figure 6:
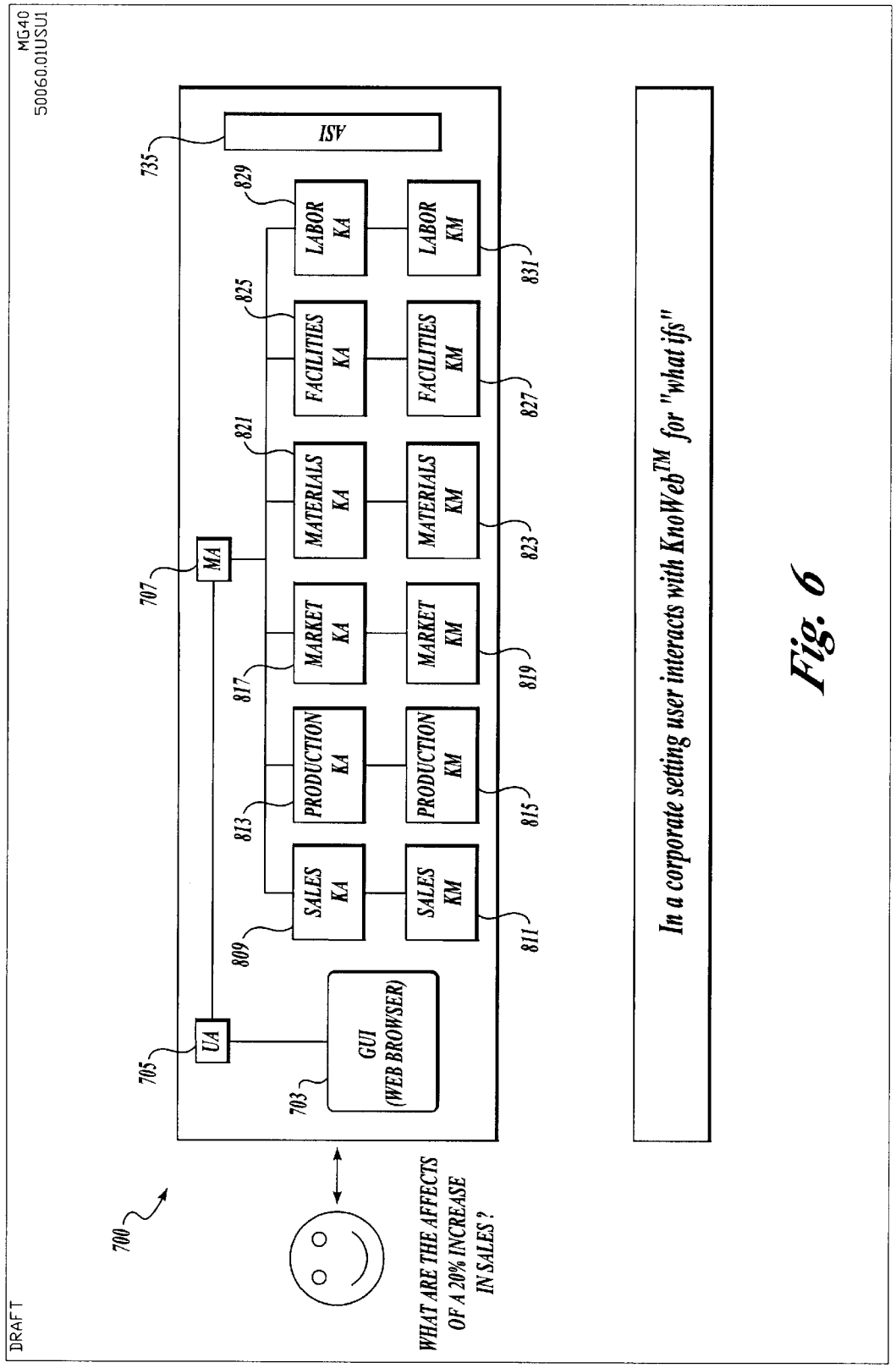
FIG. 6 is an exemplary configuration of a knowledge management system constructed in accordance with the present invention.

As illustrated in FIG. 6, the disclosed system 700 includes a user agent 705 and a meta agent 707 which function substantially as described above. The disclosed system 700 includes six knowledge agents with their respective, corresponding knowledge modules. A sales knowledge agent 709 represents a sales knowledge module 711 and provides information related to the sales of widgets, (2) a production knowledge agent 713 which represents a production knowledge module 715, (3) a marketing knowledge agent 717 which represents a marketing knowledge module 719, (4) a materials knowledge agent 721 which represents a materials knowledge module 723, (5) a facilities knowledge agent 725 which represents a facilities knowledge module 727, and (6) a labor knowledge agent 729 which represents a labor knowledge module 731. The following table illustrates the capabilities and interests of each of the knowledge modules illustrated in FIG. 6:

TABLE 1

Interests and Capabilities of Knowledge Modules

| Knowledge Module | Capabilities | Interests |
| --- | --- | --- |
| Sales 711 | Number of units<br>Price per unit<br>Total revenue | Market price<br>Cost per unit |
| Production 715 | Cost per unit | Number of units<br>Cost of production lines<br>Material costs<br>Labor costs |
| Marketing 719 | Market price | Number of units |
| Materials 723 | Material cost | Material type |
| Facilities 727 | Cost of production lines | Number of production lines |
| Labor 731 | Cost of labor | Number of workers |

Each of the knowledge agents in the system 700 registers with the agent service layer 735 these capabilities and interests.

Figures 7, 8:
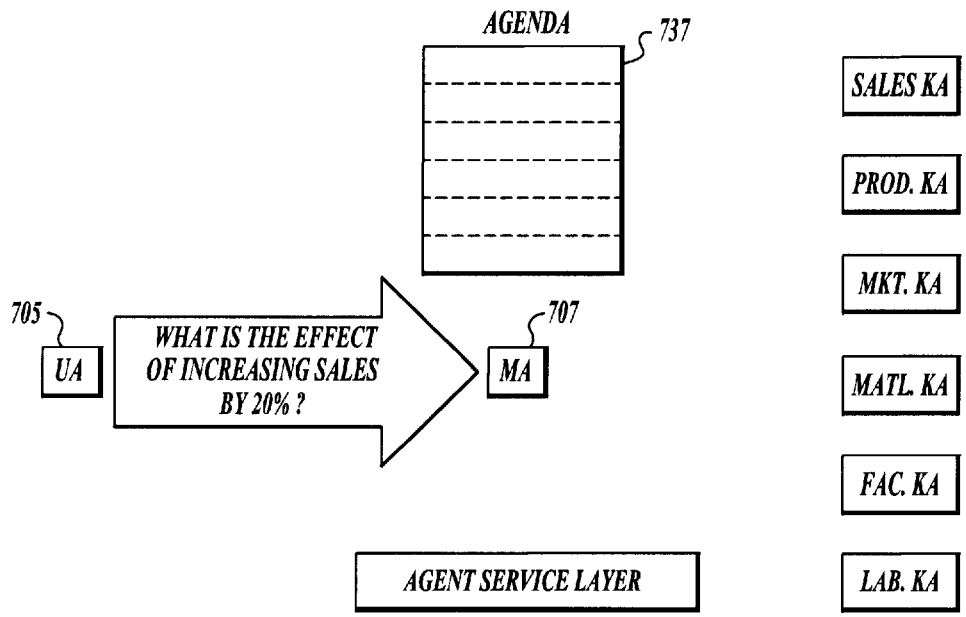
FIG. 7 is an exemplary screen display of a user interface employed by the embodiment of FIG. 8.
FIGS. 8–20 conceptually illustrate the inference procedure employed by the one embodiment of the present invention in a problem-solving exercise.

FIGS. 8–20 illustrate the flow of inferencing as a problem presented by a user is solved through distributed inferencing. This example begins when the user asks of the user agent 705 "what is the effect of increasing sales by 20%"? (FIG. 8) That query may be presented to the user agent 705 via the user GUI 703. An example of one acceptable user GUI 703 is illustrated in FIG. 7. The user agent 705 passes the inquiry to the meta agent 707.

As illustrated in FIG. 9, the meta agent 707 begins formulating a solution plan by asking 1001 the agent service layer 735 to identify a knowledge agent that has registered a capability to answer a question related to "sales." The agent service layer 735 responds 1003 by identifying the sales agent 709. The meta agent 707 pushes a task on an agenda 737 to query the sales agent 709 for the effect of increasing sales by 20%, and then issues that query 1005.

The meta agent 707 queries the agent service layer 735 to identify which knowledge agent in the knowledge agent layer has registered a capability to identify sales information. The agent service layer 735 returns to the meta agent 707 that the sales knowledge agent 709 has that capability. Accordingly, the meta agent 707 passes the user's query to the sales knowledge agent 709.

Figure 11:
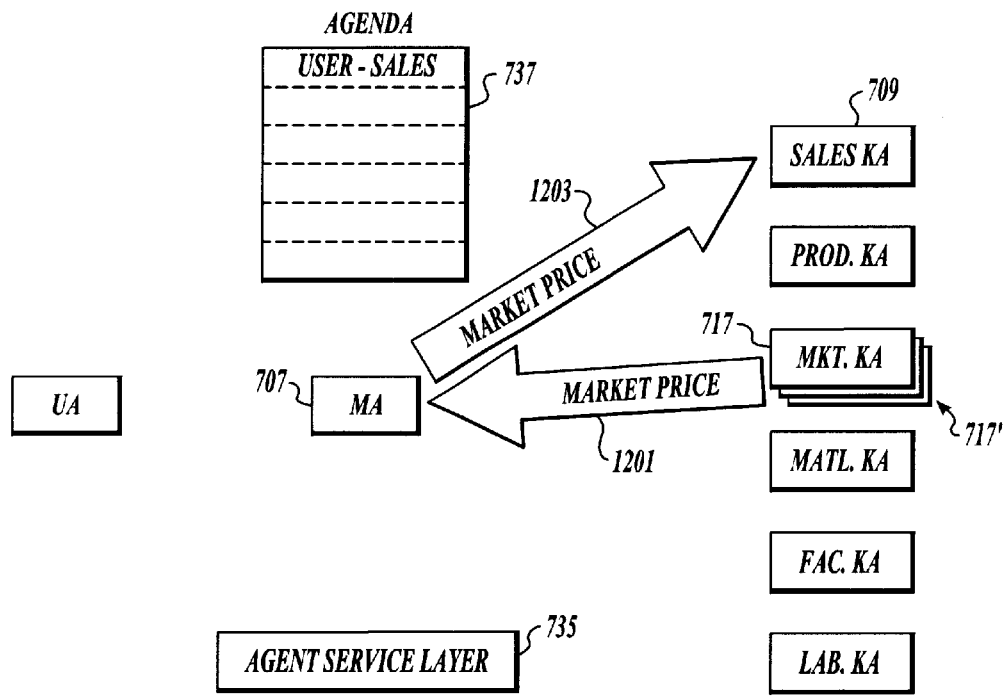

As indicated in Table 1, the sales agent 709 requires the market price and cost per unit in order to answer the query. The sales agent 709 may access its associated sales knowledge module 711 to identify the previous number of units sold to identify the number of units equal to a 20% increase, however, the sales knowledge module does not include the cost per unit at the calculated number of units. Accordingly, the sales agent 709 has insufficient information to return an answer to the query, so it returns to the meta agent 707 a second query for the information needed to answer the user's question. The sales knowledge agent 709 asks 1101 of the meta agent 707 "what is the market price at that number of units?" The meta agent 707 adds another task to the agenda 737 associated with the query from the sales agent 709, and asks 1103 the agent service layer 735 to identify which agent is responsible for determining market price. The agent service layer 735 responds 1105 by identifying the marketing agent 717 as responsible for that information. Accordingly, the meta agent 707 queries 1107 the marketing agent 717 for the market price at the specified number of units. As illustrated in FIG. 11, the marketing agent 717 returns 1201 the market price at that number of units, and the meta agent 707 forwards 1203 that information to the sales agent 709 and removes the last task from the agenda 737.

It should be noted that the present invention is configured to query multiple knowledge resources having overlapping or complementary knowledge. For example, the system 700 may include multiple instances of similar knowledge resources, such as additional marketing knowledge agents 717'. Those additional marketing knowledge agents 717' may have knowledge that overlaps, complements, or is redundant to the knowledge associated with the marketing agent 717. In those instances, the meta agent 707 may query the principal marketing agent 717 and, in addition, query the additional marketing knowledge agents 717'. In that situation, the meta agent 707 may receive from the knowledge agents results which are inconsistent. The meta agent 707 is configured to deconflict inconsistent results received from multiple instances of similar knowledge resources, such as the multiple marketing agents 717, 717'. While this example illustrates only multiple marketing agents 717', those skilled in the art will appreciate that any of the described knowledge resources may have multiple instances, and the meta agent 707 may deconflict results from any or all of those similar knowledge agents.

Figure 12:
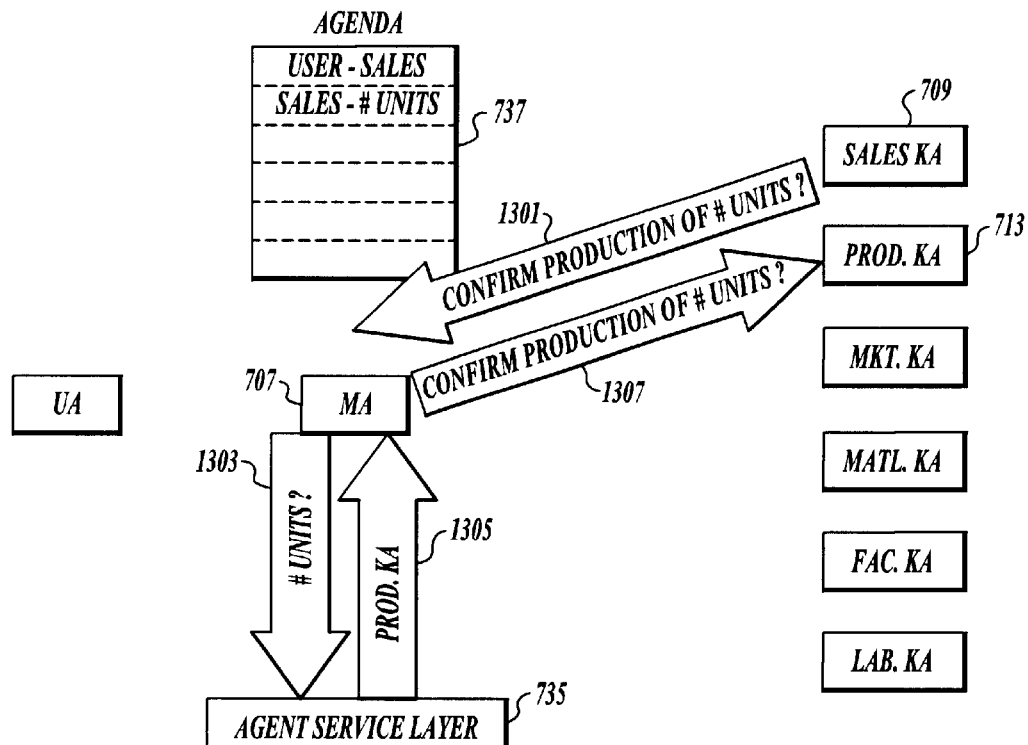

As illustrated in FIG. 12, the sales agent 709 determines that it must confirm that the production of the specified number of units is possible. Therefore, the sales agent 709 issues a query 1301 asking the meta agent 707 to confirm that the cost per unit at the specified number of units does not exceed the market price plus an acceptable profit. The meta agent 707 pushes the task on the agenda 737 and interacts with the agent service layer 735 to verify that capability. The agent service layer 735 accesses the information stored in Table 1 to identity the agent that has registered the capability of providing that information. The agent service layer 735 responds 1305 to the meta agent 707 by identifying the production agent 713. Accordingly, the meta agent 707 asks 1307 the production agent 713 to verify that capability.

Figure 13:
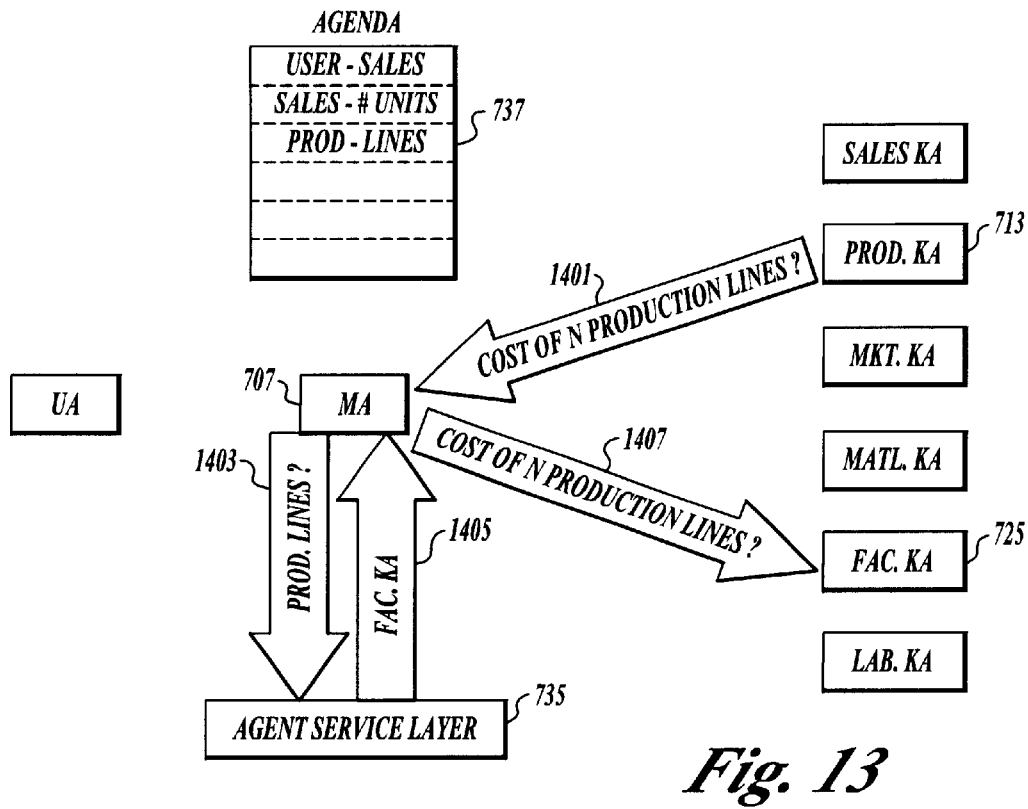

As illustrated in FIG. 13, the production agent 713 requests 1401 that the meta agent 707 identify the cost of a sufficient number of production lines to produce the specified number of units. The production agent 713 may query its associated production knowledge module 715 to determine the number of production lines necessary. The meta agent 707 pushes a new task on the agenda 737, and asks 1403 the agent service layer 735 to identify the responsible agent. The agent service layer 735 responds 1405 by identifying the facilities agent 725. Therefore, the meta agent 707 asks the facilities agent 725 for the cost of the specified number of production lines.

Figure 14:
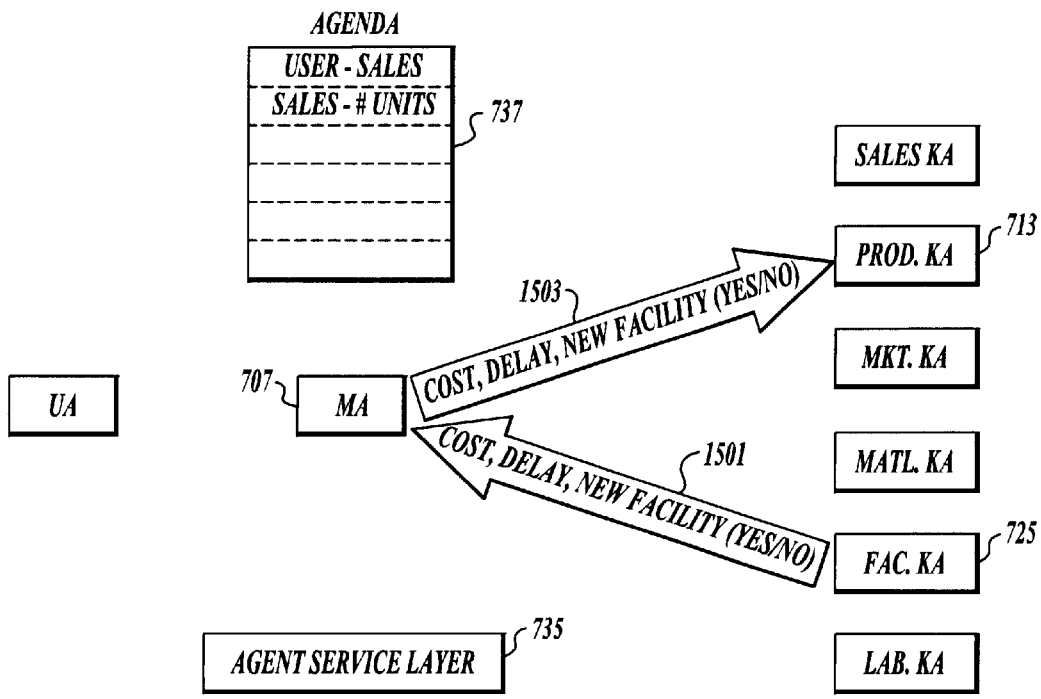

In FIG. 14, the facilities agent 725 returns 1501 to the meta agent 707 the cost of the specified number of production lines. The response 1501 may include extended information as well, such as whether a new facility will be necessary to support the number of production lines and any associated delay. The meta agent 707 clears the last task from the agenda 737, and forwards 1503 the response to the production agent 713.

Figure 15:
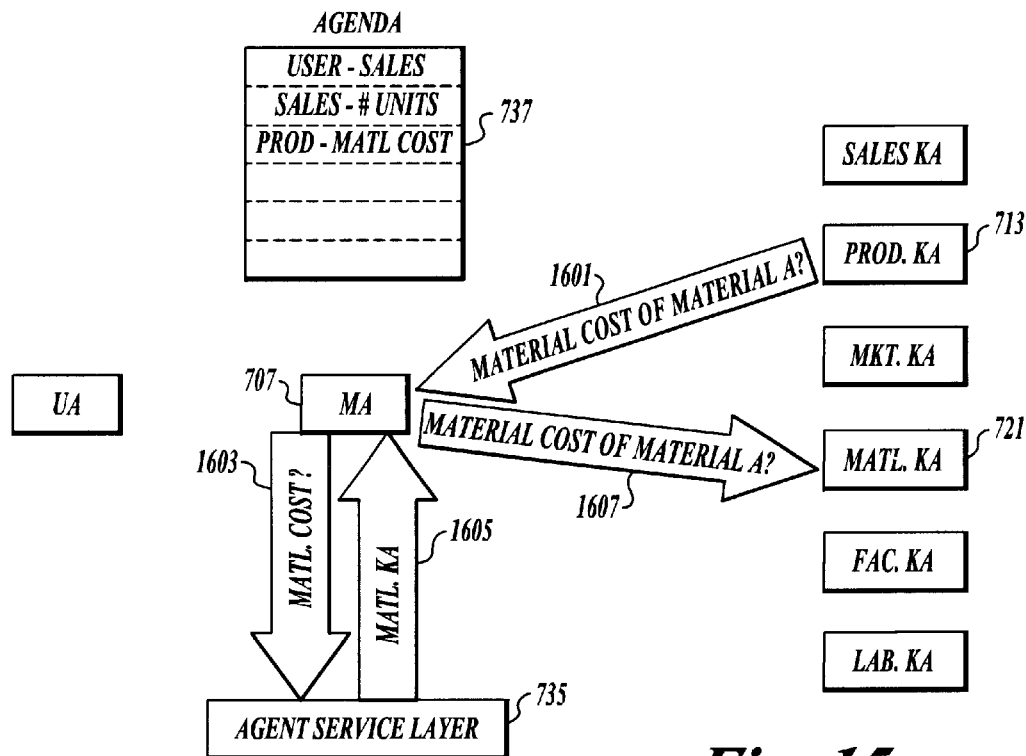
Figure 16:
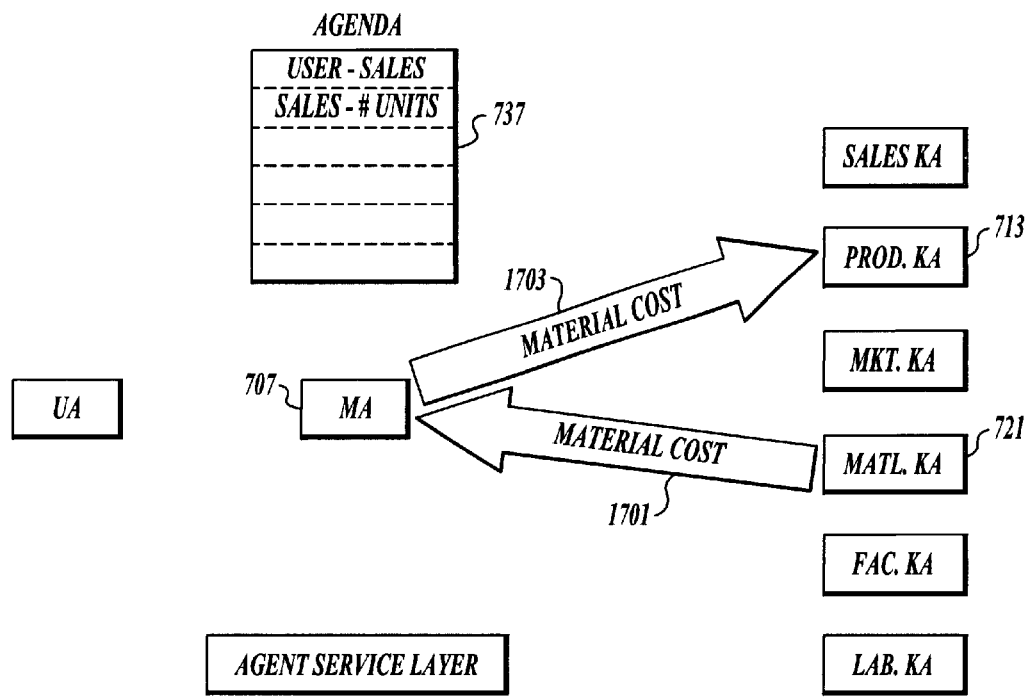

In FIG. 15, the production agent 713 requests 1601 the meta agent 707 to identify the material cost of a particular material. The production agent 713 may identify the particular material to be used to produce the product from the production knowledge module 715. The meta agent 707 pushes a task on the agenda 737 and queries 1603 the agent service layer 735 for the information. The agent service layer 735 responds 1605 that the materials agent 721 is capable of providing that information. Accordingly, the meta agent 707 issues a query 1607 to the materials agent 721 for the information. As illustrated in FIG. 16, the materials agent 721 returns 1701 the material cost, and the meta agent 707 forwards 1703 that information to the production agent 713 and removes the last task from the agenda 737.

Figure 17:
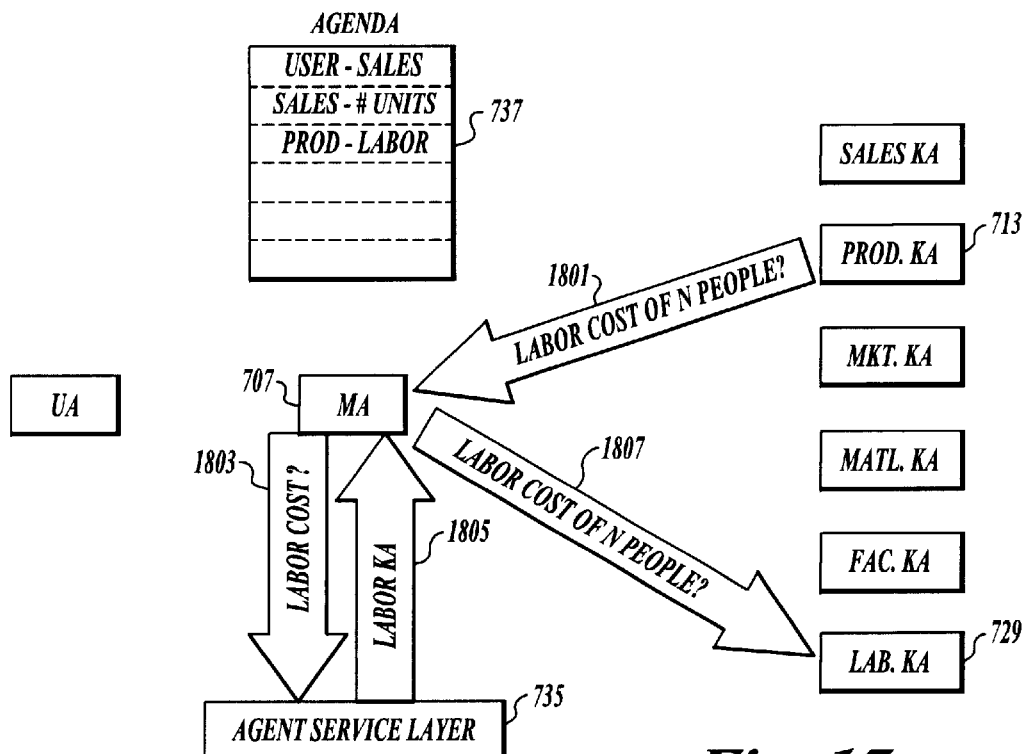
Figure 18:
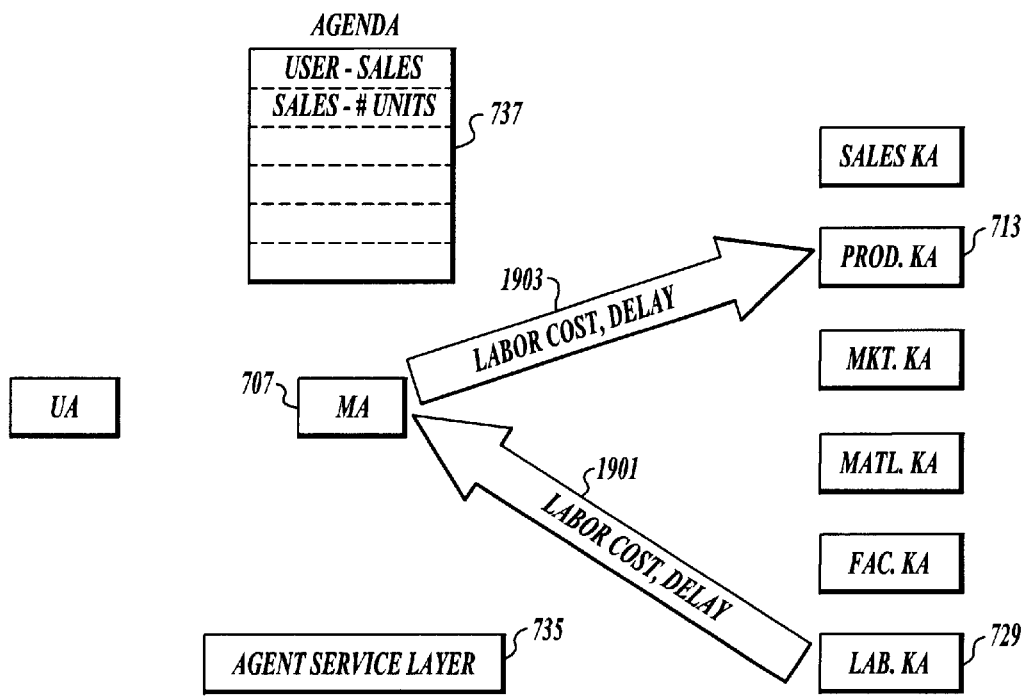

At FIG. 17, the production agent 713 requests 1801 the meta agent 707 to identify the labor cost of a number of workers sufficient to support the production lines. The production agent 713 may identify the number of workers from the production knowledge module 715. The meta agent 707 pushes another task on the agenda 737 and queries 1803 the agent service layer 735 for the information. The agent service layer 735 responds 1805 that the labor agent 729 is capable of providing that information. Accordingly, the meta agent 707 issues a query 1807 to the labor agent 729 for the information. As illustrated in FIG. 18, the labor agent 729 returns 1901 the labor cost and any delay associated with adding the new workers, and the meta agent 707 forwards 1903 that information to the production agent 713 and removes the last task from the agenda 737.

Figure 19:
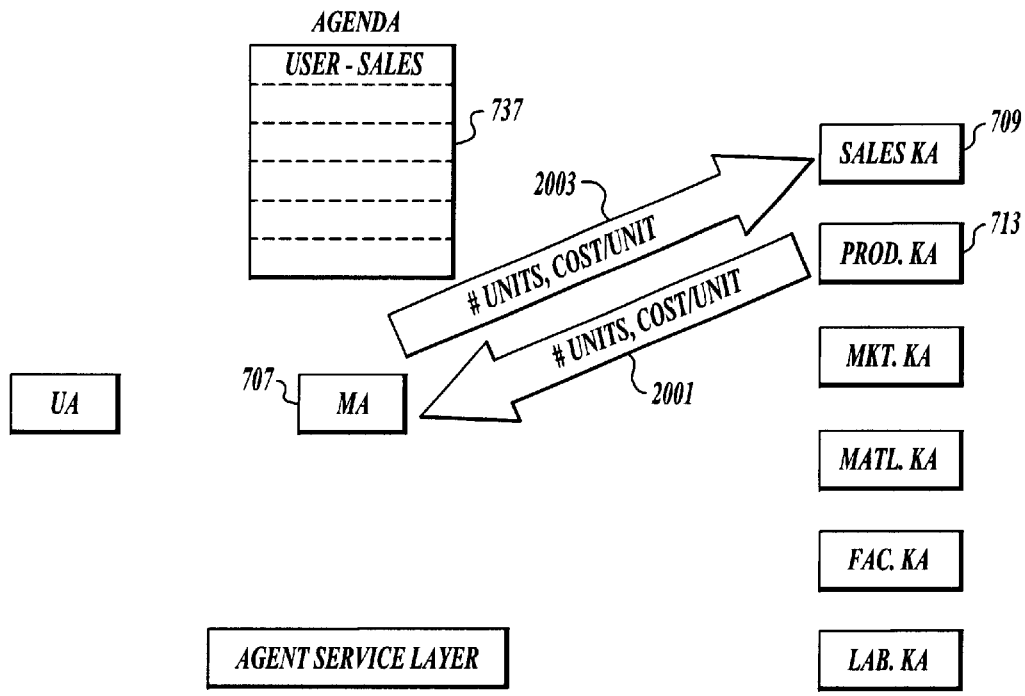

At FIG. 19, the production agent 713 has all the information required to compute the cost per unit at the specified number of units, and, accordingly, returns 2001 that information to the meta agent 707. The meta agent 707 in turn passes 2003 the information to the sales agent 709 and removes the last task from the agenda 737.

Figure 20:
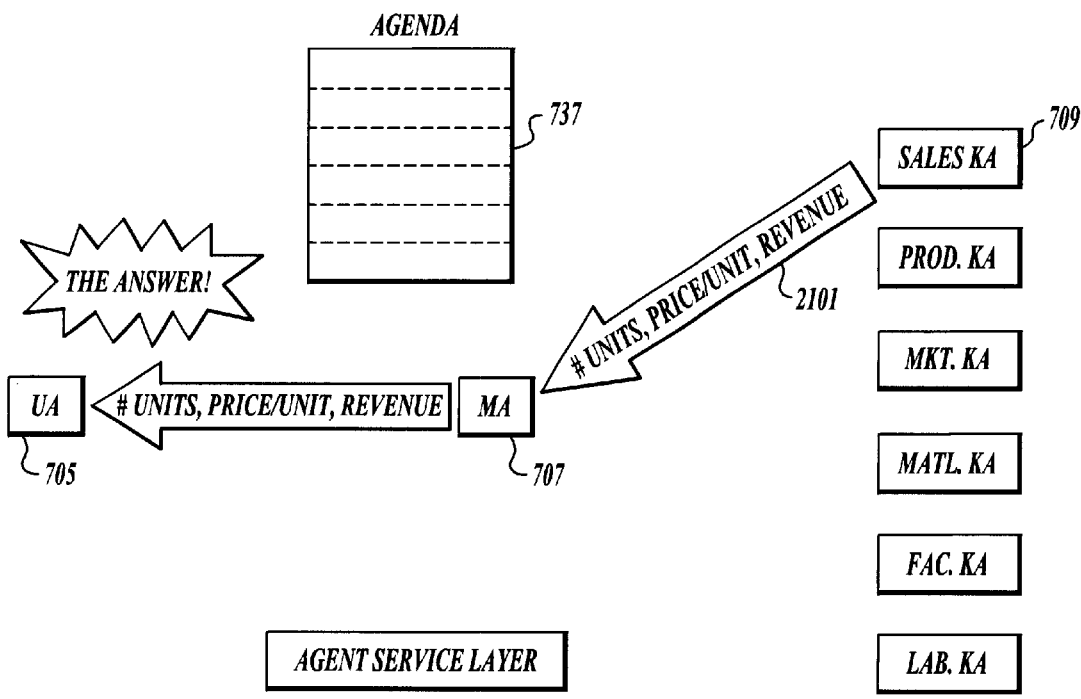

As illustrated in FIG. 20, the sales agent 709 now has enough information to address the user's original query, and, accordingly, returns 2101 the number of units capable of being manufactured, the price per unit, and the projected revenue at those numbers. The meta agent 707 forwards 2103 that information to the user agent 705 and removes the final task from the agenda 737. The user agent 705 may then present the answer to the requesting user.

Figure 21:
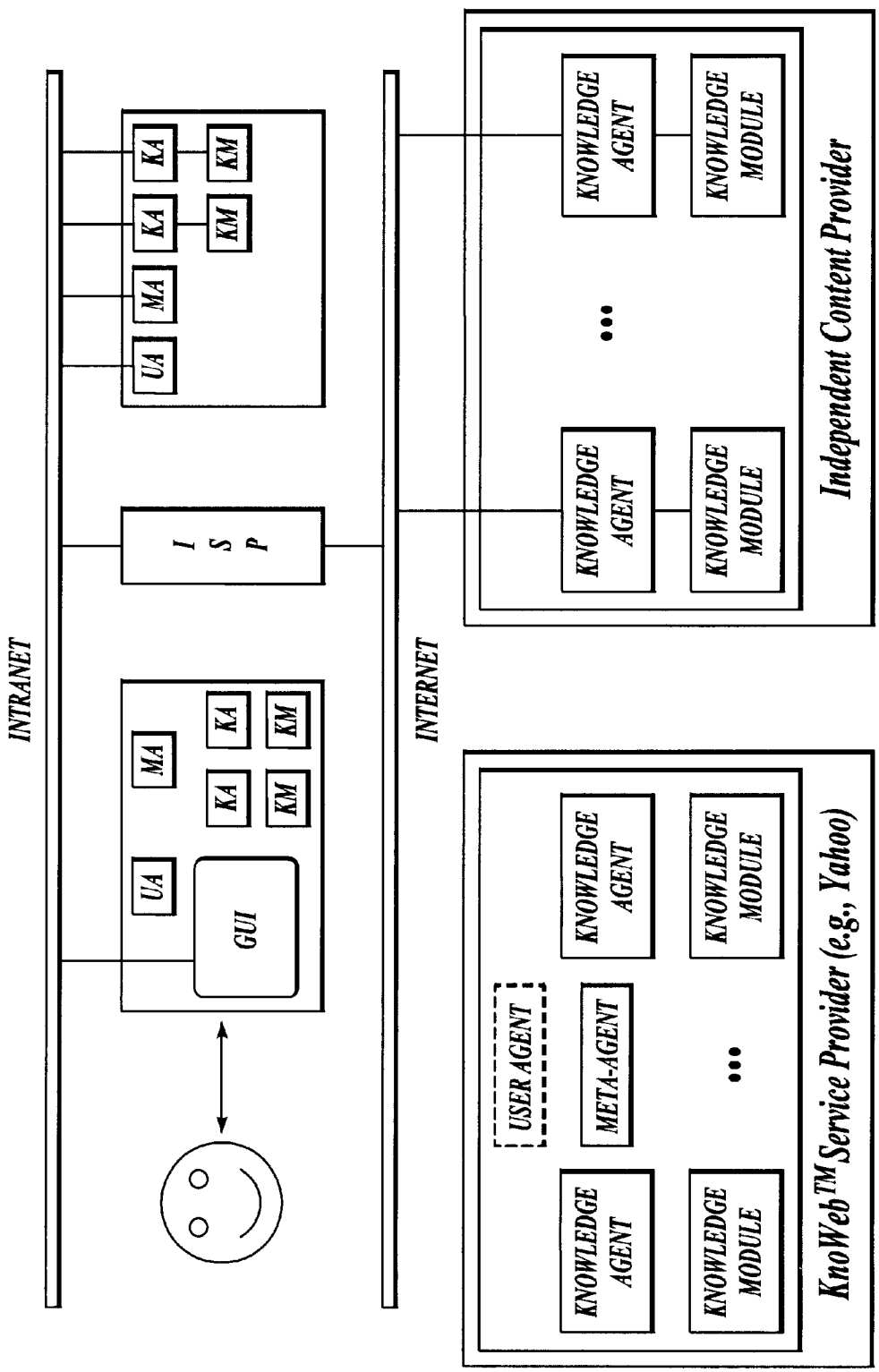
FIG. 21 illustrates another embodiment of the present invention deployed over a distributed environment.

As illustrated in FIG. 21, the knowledge management system 100 may be interconnected via available network services, such as the Internet, with other, similar systems to form a large scale, global system. The layered architecture of a user interface layer 105, a meta agent layer 107, and a knowledge agent layer 109 supports such scalability.

While preferred embodiments of the invention have been illustrated and described, it will be appreciated that various changes can be made therein without departing from the spirit and scope of the invention.

What is claimed is:

1. In a knowledge management system having a plurality of intelligent agents aid a plurality of mutually independent knowledge resources, a method of solving a problem, comprising:

accepting a knowledge query from a user;

employing an agent having inferencing capacity to identify at least one knowledge resource, from the plurality of mutually independent knowledge resources, that is relevant to the formulation of a response to the knowledge query;

interacing with the identified knowledge resource to produce the response to the knowledge query; and providing the response to the knowledge query to the user.

2. The method of claim 1, wherein each knowledge resource in the plurality of knowledge resources comprises:

a knowledge module containing information relevant to a domain of expertise; and a first intelligent agent configured to conduct inference processing in cooperation with another intelligent agent in the knowledge management system, the first intelligent agent being further configured to retrieve the information from the knowledge module.

3. The method of claim 2, wherein two knowledge modules associated with two knowledge resources in the plurality of knowledge resources comprise knowledge that is overlapping.

4. The method of claim 2, wherein two knowledge modules associated with two knowledge resources in the plurality of knowledge resources comprise knowledge that is independent (non-overlapping).

5. The method of claim 2, wherein two knowledge modules associated with two knowledge resources in the plurality of knowledge resources comprise knowledge that is complementary.

6. The method of claim 1, wherein one knowledge resource in the plurality of knowledge resources includes a knowledge module selected from a group comprising: a knowledge-based system; a simulation; a database; a world wide web site; a real-time data stream; a computational resource; an interactive system; a data processing device; an algorithm; and a data repository.

7. A knowledge management system, comprising:
   a user agent configured to mediate interactions between a user and the knowledge management system, the interactions including the receipt of a query from the user;
   a meta agent having inferencing capability and an interface to the user agent operative to receive the query from the user agent, the meta agent being configured to determine and execute a plan to respond to the query by interacting with a plurality of knowledge agents; and
   the plurality of knowledge agents being configured to mediate interactions between the meta agent and a plurality of knowledge resources, each knowledge agent in the plurality of knowledge agents having inferencing capability and being associated with at least one knowledge resource in the plurality of knowledge resources.

8. The knowledge management system of claim 7, wherein the user agent is further configured to:
   prompt the user for additional information needed to service the query;
   accept the input of the additional information from the user;
   pass the input to the meta agent; and
   render to the user progress information related to the execution of the plan to respond to the query.

9. The knowledge management system of claim 8, wherein the user agent is further configured to:
   accept a request from the user for an explanation of the progress information related to the execution of the plan to respond to the query; and
   provide the user with the requested explanation.

10. The knowledge management system of claim 7, wherein the user agent is further configured to generate a problem statement based on the user query, and wherein the meta agent is further configured to:
    analyze the problem statement generated by the user agent to create a set of sub-problems for solution;
    identify one knowledge resource in the plurality of knowledge resources that is relevant to the solution of at least one sub-problem in the set of sub-problems;
    based on the identification of the one knowledge resource, produce a plan for interactions with the knowledge agent associated with the identified one knowledge resource; and
    in accordance with the plan for interactions, issue the at least one sub-problem to the knowledge agent associated with the identified one knowledge resource.

11. The knowledge management system of claim 10, wherein the meta agent is further configured to:
    consolidate responses received from more than one knowledge agent into a canonical response; and
    issue the canonical response to the user agent.

12. The knowledge management system of claim 11, wherein the canonical response to the user agent may be sub-optimal yet valid within problem and stated constraints.

13. The knowledge management system of claim 11, wherein the meta agent is further configured with the capability to receive the responses in one of a plurality of communications modes comprising: asynchronously, incrementally, concurrently, and preemptively.

14. The knowledge management system of claim 11, wherein the meta agent is further configured to perform a test to analyze the responses to determine the ontological and semantic similarities between the responses, the similarity test comprising:
    determining if the responses describe identical ontological, syntactic, and semantic entities and if the responses differ only in value;
    determining if the responses describe identical ontological and semantic entities, but exhibit syntactic differences; and
    determining if the responses describe entities for which the ontological, syntactic, and semantic similarity does not meet a specified threshold.

15. The knowledge management system of claim 14, wherein if the similarity test determines that the responses describe identical ontological, syntactic, and semantic entities and differ only in value, the meta agent is configured to consolidate the responses using a specified consolidation technique.

16. The knowledge management system of claim 15, wherein the specified consolidation technique comprises a selected one from a group comprising: statistical analysis, Bayesian analysis, boolean logic, voting, and algorithmic convolution.

17. The knowledge management system of claim 14, wherein if the similarity test determines that syntactic differences exist, the responses are analyzed to determine if a common intermediate form exhibiting identical ontological, syntactic, and semantic properties exists into which all responses can be converted.

18. The knowledge management system of claim 17, wherein if the common intermediate form exists, the meta agent is configured to consolidate the responses using a specified consolidation technique.

19. The knowledge management system of claim 14, wherein the responses are submitted to the user, via the user agent, for assessment and selection of an appropriate response.

20. The knowledge management system of claim 19, wherein if the selected response represents an intermediate response (solution to a sub-problem), the user's selection is submitted back to the knowledge management system and used to support subsequent processing of the query.

21. The knowledge management system of claim 10, wherein the meta agent is further configured to:
    receive from the knowledge agent associated with the identified one knowledge resource a request for additional information related to solving the at least one sub-problem;
    identify another knowledge resource in the plurality of knowledge resources that is relevant to the request for additional information related to solving the at least one sub-problem; and
    issue to the identified other knowledge resource the request for additional information related to solving the at least one sub-problem.

22. The knowledge management system of claim 10, wherein the meta agent is further configured to:
   identify a need for additional information from the user agent for the solution of the at least one sub-problem; and
   issuing a request to the user agent for the additional information.

23. The knowledge management system of claim 7, wherein the meta agent dynamically configures the distributed resources of the knowledge modules and their representative knowledge agents to solve the problem.

24. The knowledge management system of claim 7, wherein each knowledge agent in the plurality of knowledge agents is further configured to:
   accept from the meta agent a sub-problem statement related to the plan to respond to the query;
   convert the sub-problem statement into a format appropriate for the knowledge resource associated with the knowledge agent;
   retrieve a response from the knowledge resource based on the formatted sub-problem statement; and
   return the response to the meta agent.

25. The knowledge management system of claim 24, wherein each knowledge agent in the plurality of knowledge agents is further configured to:
   generate a request for additional information required to solve the sub-problem statement;
   pass the generated request to the meta agent; and
   receive from the meta agent any additional information provided.

26. The knowledge management system of claim 7, wherein each knowledge agent in the plurality of knowledge agents is further configured to dynamically register, with the knowledge management system, attribute information describing the knowledge module associated with the knowledge agent.

27. The knowledge management system of claim 26, wherein the attribute information comprises: interests, capabilities, knowledge source, knowledge ontology, knowledge domain, date and time of creation of the knowledge resource, date and time of last update of the knowledge resource, limitations on validity of knowledge, level of expertise of the knowledge resource, confidence in the validity of the knowledge, validating authority, appropriate audiences for the knowledge, associated fees for use of the knowledge resource, and certification.

28. The knowledge management system of claim 27, wherein mappings between the interests and the capabilities of the knowledge agent are stored and used by the meta agent to optimize the distributed problem solving.

29. The knowledge management system of claim 7, wherein the meta agent is further configured to:
   provide to the user agent a plan execution status report describing the status of execution of the plan to respond to the query; and
   provide to the user agent an explanation of the plan to respond to the query.

30. The knowledge management system of claim 29, wherein the explanation of the plan comprises a rationale of the use of specific knowledge resources.

31. The knowledge management system of claim 7, wherein the inferencing capability comprises a plurality of modes.

32. The knowledge management system of claim 31, wherein the plurality of modes comprises a linear mode, a partitioned mode, a replicated mode, a real-time mode, a preemptive mode, and a qualitative mode.

33. The knowledge management system of claim 7, wherein the inferencing capability of the meta agent is further configured to support: parallel sub-plans; iterative plan development; recursive planning; incremental plan development; revisiting knowledge resources for additional information; backtracking; and replanning.

* * * * *

UNITED STATES PATENT AND TRADEMARK OFFICE
CERTIFICATE OF CORRECTION

PATENT NO.    : 6,484,155 B1
DATED         : July 21, 1999
INVENTOR(S)   : Peter A. Kiss et al.

It is certified that error appears in the above-identified patent and that said Letters Patent is hereby corrected as shown below:

<u>Column 1,</u>
Lines 13-15, reading "The development of this invention was funded at least in part under U.S. Government Contract No. DASG60-98-C-0104." should read -- This invention was made with Government support under contract DASG60-98-C-0104 awarded by the U.S. Army Space and Missile Defense Command The Government has certain rights in the invention. --.

Signed and Sealed this

Fourth Day of March, 2003

JAMES E. ROGAN
*Director of the United States Patent and Trademark Office*